United States Patent
Ihara et al.

(10) Patent No.: US 6,212,580 B1
(45) Date of Patent: Apr. 3, 2001

(54) INTEGRATED RECORDER SYSTEM WHICH READS AN INSTRUMENTAL SIGNAL FROM AN INPUT MODULE SO AS TO RECORD INSTRUMENTAL DATA DERIVED FROM THE INSTRUMENTAL SIGNAL, AND TRANSMITS THE INSTRUMENTAL DATA RECORDED THEREIN TO AN OUTPUT MODULE

(75) Inventors: Keizo Ihara, Hachiohji; Shizuo Hosaka, Tokyo; Mineaki Kumamoto, Mitaka, all of (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 09/170,486

(22) Filed: Oct. 13, 1998

(30) Foreign Application Priority Data

Oct. 21, 1997 (JP) .................................................... 9-288572

(51) Int. Cl.⁷ .............................. G06F 13/14; G06F 13/20
(52) U.S. Cl. .................................. 710/8; 710/36; 710/37; 710/38; 710/12; 358/468
(58) Field of Search .................................... 710/1, 36, 37, 710/38, 8, 12; 358/468

(56) References Cited

U.S. PATENT DOCUMENTS 5,532,844 * 7/1996 Kagami et al. ...................... 358/468
5,537,289 * 7/1996 Dahl ...................................... 361/681
5,822,547 * 10/1998 Boesch et al. ....................... 395/283
5,860,060 * 1/1999 Li et al. ................................ 704/500

FOREIGN PATENT DOCUMENTS

| 3701978 | 8/1988 | (DE) . |
| 0490864 | 6/1992 | (EP) . |
| 09113318 | 5/1997 | (JP) . |
| 09223354 | 8/1997 | (JP) . |

* cited by examiner

Primary Examiner—Thomas Lee
Assistant Examiner—Rehana Perveen
(74) Attorney, Agent, or Firm—Ladas & Parry

(57) ABSTRACT

An integrated recorder system includes a recorder main part having a control unit which records instrumental data in a data memory, the control unit and the data memory being interconnected by a shared bus. A plurality of modules are arbitrarily inserted in or withdrawn from the recorder main part, the modules including an input module, the input module having a connector terminal from which an instrumental signal is supplied. A data interface unit is provided in the recorder main part and has a plurality of slots which connect the plurality of modules inserted therein to the data interface unit, the data interface unit being controlled by the control unit through the bus to read the instrumental signal from the input module when inserted in the recorder main part, such that the instrumental data is recorded in the data memory, and controlled by the control unit through the bus to transmit the instrumental data, recorded in the data memory, to an output module when inserted in the recorder main part.

8 Claims, 5 Drawing Sheets

F I G. 1
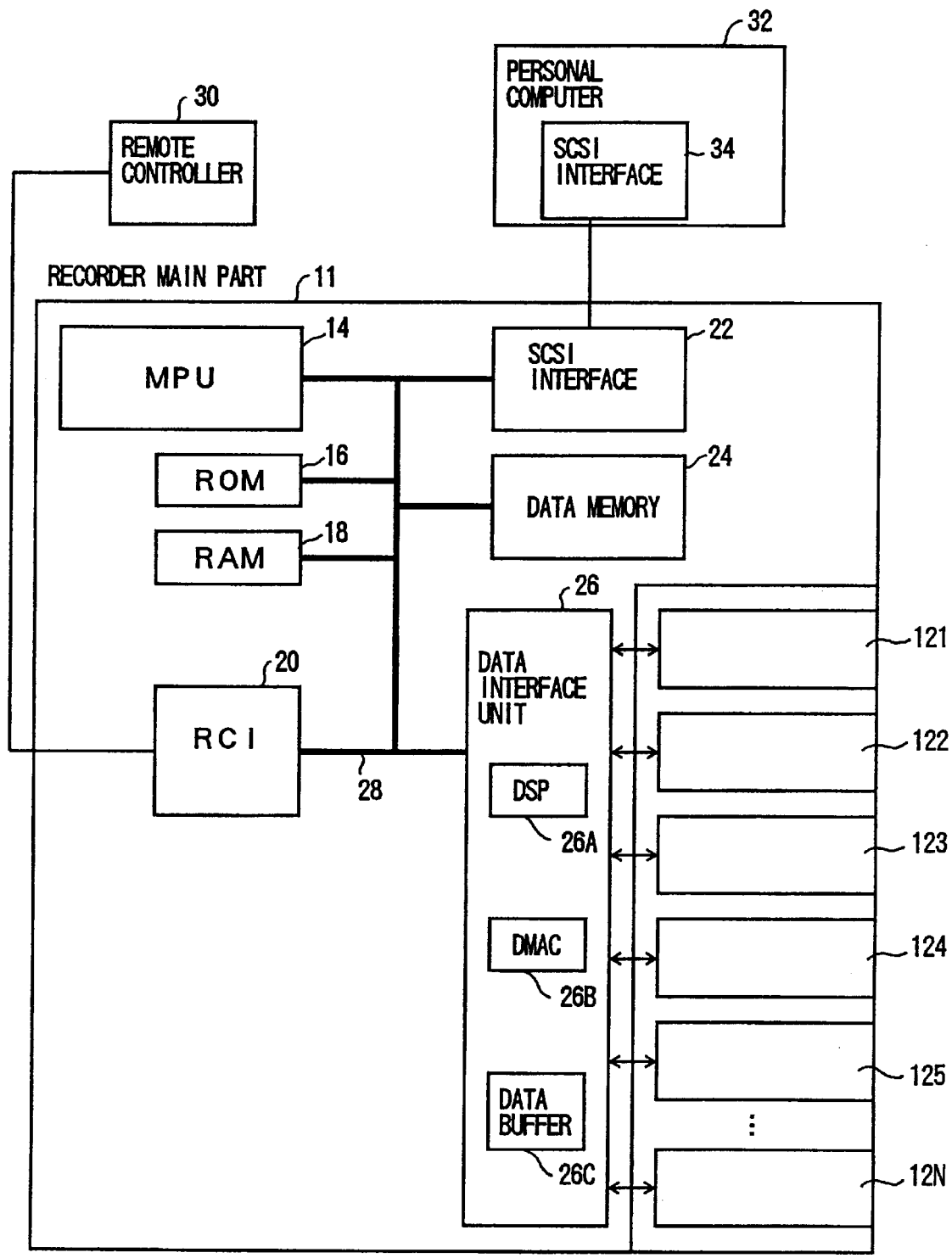

INTEGRATED RECORDER SYSTEM WHICH READS AN INSTRUMENTAL SIGNAL FROM AN INPUT MODULE SO AS TO RECORD INSTRUMENTAL DATA DERIVED FROM THE INSTRUMENTAL SIGNAL, AND TRANSMITS THE INSTRUMENTAL DATA RECORDED THEREIN TO AN OUTPUT MODULE

BACKGROUND OF THE INVENTION (1) Field of the Invention

The present invention generally relates to an instrumentation recorder system, and more particular to an instrumentation recorder system which reads an instrumental signal from an input module so as to record instrumental data derived from the instrumental signal, and transmits the instrumental data recorded therein to an output module.

(2) Description of the Related Art

An instrumentation recorder system which reads instrumental signals supplied by plural input modules, so as to record the instrumental data from the input modules in a data memory, is known. In the instrumentation recorder system, a recorder main part is provided to record the instrumental data in the data memory, and the recorder main part includes plural slots for accommodating the input modules being inserted. The input modules inserted in the recorder main part are changeable depending on the type of the instrumental signals supplied by the input modules. Among the input modules being inserted, there are an analog-input module and a digital-input module, the analog-input module supplying an analog instrumental signal to the recorder main part, the digital-input module supplying a digital instrumental signal to the recorder main part.

In a conventional instrumentation recorder system of the above type, some of the slots of the recorder main part are allocated for the analog-input modules only, and the other slots of the recorder main part are allocated for the digital-input modules only. For example, it is impossible to make use of the digital-input module inserted in one of the analog-input slots for the analog-input modules only. The number of the analog-input modules that can be effectively used with the recorder main part or the number of the digital-input modules that can be effectively used with the recorder main part is limited.

There is another conventional recorder system in which a particular one of the slots of the recorder main part is allocated for an output module only. When the output module is inserted in the recorder main part, the recorder main part transmits the recorded instrumental data to the output module. Similarly, in such a recorder system, it is impossible to make use of the output module inserted in one of the analog-input slots or the digital-input slots. Because the output slot for the output module only must be included in the slots of the recorder main part, the number of the input modules that can be effectively used with the recorder main part is further limited.

SUMMARY OF THE INVENTION

An object of the present invention is to provide an improved instrumentation recorder system in which the above-described problems are eliminated.

Another object of the present invention is to provide an integrated recorder system in which a plurality of modules can be arbitrarily inserted in or withdrawn from the slots of the recorder main part, regardless of whether the module being inserted is the input module or the output module.

The above-mentioned objects of the present invention are achieved by an integrated recorder system comprising: a recorder main part having a control unit which records instrumental data in a data memory, the control unit and the data memory being interconnected by a shared bus; a plurality of modules which are arbitrarily inserted in or withdrawn from the recorder main part, the plurality of modules including an input module, the input module having a connector terminal from which an instrumental signal is supplied, wherein, when the instrumental signal is an analog signal, the input module converts the analog signal into a digital signal indicating instrumental data, and supplies the digital signal to the recorder main part; and a data interface unit which is provided in the recorder main part and has a plurality of slots which connect the plurality of modules inserted therein to the data interface unit, the data interface unit being controlled by the control unit through the bus to read the instrumental signal from the input module when inserted in the recorder main part, such that the instrumental data is recorded in the data memory, and controlled by the control unit through the bus to transmit the instrumental data, recorded in the data memory, to an output module when inserted in the recorder main part.

In the integrated recorder system of the present invention, the plurality of modules can arbitrarily be inserted in or withdrawn from the slots of the data interface unit of the recorder main part, regardless of whether the module being inserted is the input module or the output module. It is not necessary to allocate a particular slot of the recorder main part for an output-only module or to allocate a particular slot of the recorder main part for an input-only module. It is possible for the integrated recorder system of the present invention to allocate all the slots of the data interface unit to the input modules which supply either analog signals or digital signals to the recorder main part. The integrated recorder system of the present invention is effective in providing flexibility of the number of the input modules or the output modules that can be inserted in the slots of the data interface unit.

In the integrated recorder system of the a present invention, each of the plurality of modules is provided with a memory which stores a module description data indicating the type of the module and the type of the instrumental signal related to the module, and the recorder main part supplies control data to a control register of the module based on the module description data from the memory of the module. The control register supplies the control data to the elements of the module, and the elements of the module are operated with the recorder main part in accordance with the control data. The integrated recorder system of the present invention is effective in automatically reading an instrumental signal from the input module, so as to record instrumental data derived from the instrumental signal, and in automatically transmitting the instrumental data recorded therein to the output module, regardless of the type of the modules inserted in the recorder main part.

BRIEF DESCRIPTION OF THE DRAWINGS

Other objects, features and advantages of the present invention will be more apparent from the following detailed description when read in conjunction with the accompanying drawings in which:

FIG. 1 is a block diagram showing a construction of an integrated recorder system embodying the present invention;

DETAILED DESCRIPTION OF THE PREFERRED EMBODIMENTS

Figure 2:
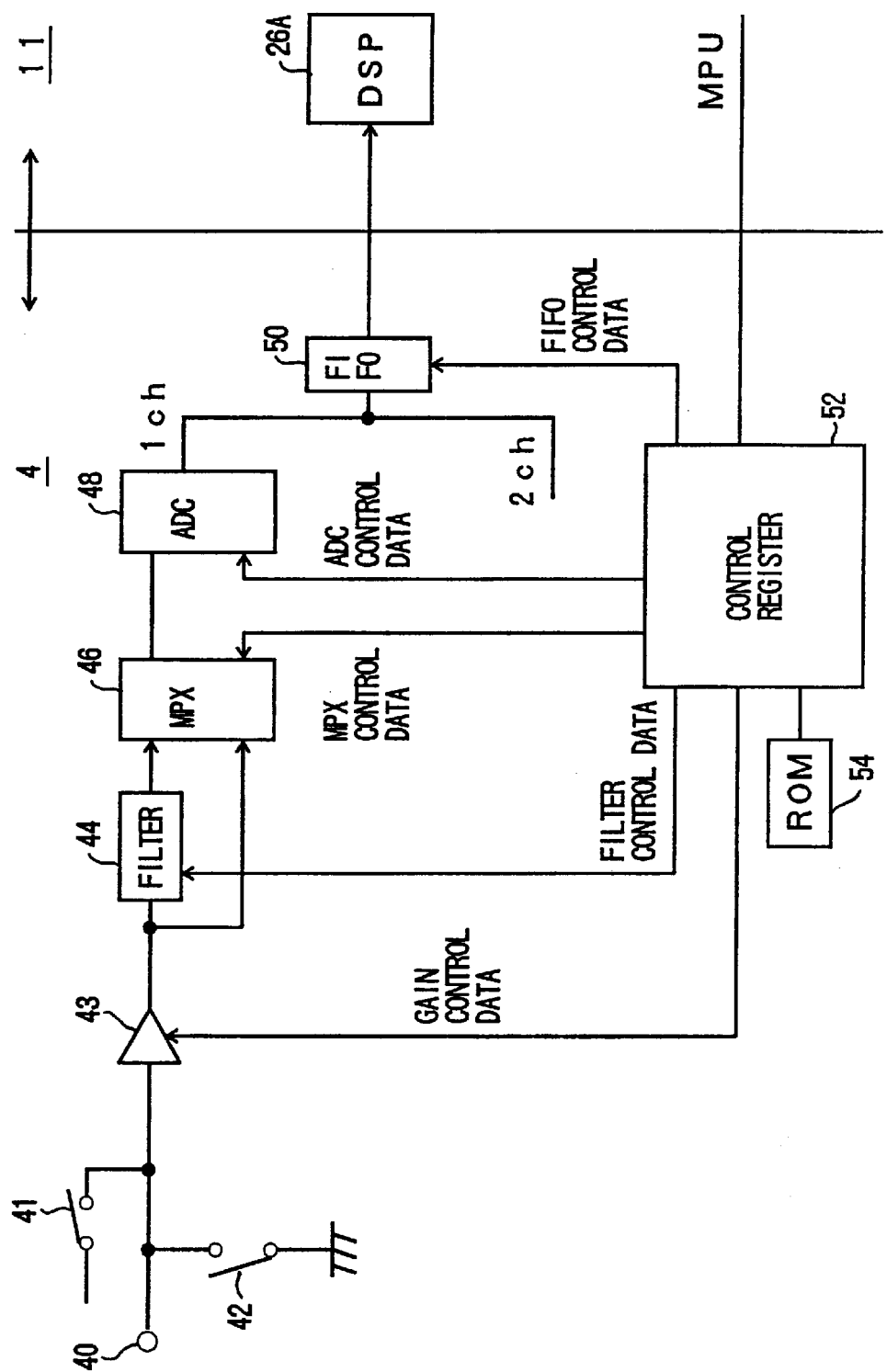
FIG. 2 is a block diagram showing a construction of an input module of the integrated recorder system of the present invention.

A description will now be given of the preferred embodiments of the present invention with reference to the accompanying drawings.

FIG. 1 shows a construction of an integrated recorder system embodying the present invention. The integrated recorder system of the present embodiment reads an instrumental signal supplied by an input module so as to record instrumental data derived from the instrumental signal, and transmits the instrumental data recorded therein to an output module.

As shown in FIG. 1, the integrated recorder system generally includes a recorder main part 11 and a plurality of modules 121 through 12N (where N is a predetermined number).

The recorder main part 11 generally includes a microprocessor unit (MPU) 14, a read-only memory (ROM) 16, a random access memory (RAM) 18, a remote controller interface (RCI) 20, a SCSI interface 22, a data memory 24, and a data interface unit 26. SCSI is an abbreviation of small computer systems interface. The above-mentioned elements 14–26 of the recorder main part 11 are interconnected by a shared bus 28.

In the integrated recorder system, a remote controller 30 is externally provided to the recorder main part 11. The remote controller 30 is connected through the RCI 20 to the MPU 14. A personal computer 32 is also externally connected to the recorder main part 11. The personal computer 32 includes a SCSI interface 34, and the SCSI interface 34 is connected through the SCSI interface 22 of the recorder main part 11 to the MPU 14.

In the integrated recorder system of FIG. 1, the data interface unit 26 includes a DSP (digital signal processor) 26A, a DMAC (direct memory access controller) 26B, and a data buffer 26C. The data interface unit 26 is provided with a predetermined number "N" of bus-connection slots (where N is an integer, and, for example, N=8), and each of the modules 121–12N can be inserted in or withdrawn from an arbitrary one of the slots of the data interface unit 26 in the recorder main part 11. In the recorder main part 11, the modules 12112N, which are inserted in the slots of the data interface unit 26, are connected to the data interface unit 26, so that the modules 121–12N, the data interface unit 26 and the data memory 24 are connected to one another by the shared bus 28.

When a power switch (not shown) of the recorder main part 11 is turned ON, a program is read from the ROM 16 and loaded into the RAM 18 by the MPU 14. During the execution of the program by the MPU 14, the data interface unit 26 is controlled to read instrumental data from a related one of the modules 121–12N when the related module is inserted in the recorder main part 11. The data interface unit 26 is then controlled to write the instrumental data to the data memory 24 by using the DMAC 26B. Before writing the instrumental data to the data memory 24, the data buffer 26C temporarily retains the instrumental data read from the related module. The instrumental data retained in the data buffer 26C is written to the data memory 24 by the DMAC 26B. During this processing, the DSP 26A performs filtering of the instrumental data so as to eliminate high-frequency components produced therein by an analog-to-digital converter of the related one of the modules 121–12N. The RAM 18 is used as a working storage of the MPU 14.

The instrumental data, stored in the data memory 24, can be transmitted from the recorder main part 11 to the personal computer 32 via the SCSI interface 22 and the SCSI interface 34. During an operation of the integrated recorder system of FIG. 1, the remote controller 30 can be used to control the elements of the recorder main part 11 so as to control the read/write and transmit operations of the recorder main part 11.

FIG. 2 shows a construction of an input module 4 of the integrated recorder system of the present invention.

In the present embodiment, the input module 4 is inserted in one of the slots of the data interface unit 26 of the recorder main part 11, and the input module 4 supplies an instrumental signal to the recorder main part 11 through the data interface unit 26. The data interface unit 26 is controlled to read the instrumental signal from the input module 4, and instrumental data, derived from the instrumental signal, is written to the data memory 24. The instrumental signal supplied by the input module 4 is, for example, a DC analog signal that is indicative of an instrumental value being supplied to the recorder main part 11.

As shown in FIG. 2, in the input module 4 of the present embodiment, the instrumental signal is supplied from a connector terminal 40 to a gain amplifier 43. The gain amplifier 43 serves as an input amplifier of the input module 4. A switch 41 is connected at one end to a reference voltage source (not shown) and at the other end to the connector terminal 40. When the switch 41 is set in a closed position (or an ON status), a reference voltage Vref from the reference voltage source is supplied through the switch 41 to the gain amplifier 43. The reference voltage Vref is supplied to adjust the gain of the gain amplifier 43 for the instrumental signal based on the reference voltage Vref. A switch 42 is grounded at one end and connected at the other end to the connector terminal 40. When the switch 42 is set in a closed position (or an ON status), the instrumental signal supplied from the connector terminal 40 is cut off from the gain amplifier 43.

The instrumental signal supplied from the connector terminal 40 is amplified by the gain amplifier 43, and the amplified signal at the output of the gain amplifier 43 is supplied through a filter 44 to a first input of a multiplexer (MPX) 46, and supplied directly to a second input of the MPX 46. The filter 44 passes through the amplified signal only when the amplified signal has a frequency that is in conformity with a cutoff frequency of the filter 44. The MPX 46 selects one of the signal at the first input of the MPX 46 and the signal at the second input of the MPX 46, and supplies the selected signal to an analog-to-digital converter (ADC) 48. The ADC 48 converts the selected signal at the input of the ADC 48 into a digital signal, or the instrumental data, at the output of the ADC 48, and supplies the instrumental data to a first-in first-out (FIFO) unit 50. The instrumental data supplied by the ADC 48 is temporarily retained by the FIFO unit 50, and the FIFO unit 50 transmits the instrumental data to the DSP 26A of the data interface unit 26 of the recorder main part 11.

In the input module 4, as shown in FIG. 2, the above-described elements 41 through 48 between the connector terminal 40 and the FIFO unit 50 are provided as a first-channel ("1 ch") signal line in the input module 4. Further, in the input module 4, additional elements which are essentially the same as the elements 41 through 48 of the first-channel signal line are also provided as a second-channel ("2 ch") signal line between the connector terminal 40 and the FIFO unit 50, but the additional elements are not illustrated in FIG. 2 for the sake of simplicity of description.

Further, in the input module 4, as shown in FIG. 2, a control register 52 which supplies respective control data to the gain amplifier 43, the filter 44, the MPX 46, the ADC 48 and the FIFO unit 50 in the input module 4 is provided. The control data supplied by the control register 52 include gain control data for the gain amplifier 43, filter control data for the filter 44, MPX control data for the MPX 46, ADC control data for the ADC 48, and FIFO control data for the FIFO unit 50. When the input module 4 is inserted in one of the bus-connection slots of the data interface unit 26 in the recorder main part 11, the input module 4, the data interface unit 26 and the data memory 24 are connected to one another by the shared bus 28. More specifically, the FIFO unit 50 of the input module 4 is connected to the DSP 26A of the data interface unit 26 by the bus connection slot, and the data interface unit 26 and the data memory 24 are interconnected by the shared bus 28 in the recorder main part 11. Further, the control register 52 of the input module 4 is connected through the data interface unit 26 to the MPU 14 in the recorder main part 11.

In the input module 4, a read-only memory (ROM) 54 is connected to the control register 52, and stores a module description data. The module description data stored in the ROM 54 is indicative of whether the module related to the control register 52 (or, in the present embodiment, the input module 4) is an input module or an output module, it is indicative of whether the instrumental signal supplied from or to the related module is a digital signal or an analog signal, and it is indicative of whether the instrumental signal supplied from or to the related module is a DC (direct current) signal or an AC (alternating current) signal.

When the power switch of the recorder main part 11 is turned ON, the MPU 14 accesses the control register 52 and the ROM 54 in the input module 4 when the input module 4 is inserted in the slot of the data interface unit 26, and reads the module description data from the ROM 54. The MPU 14 determines control data in response to the module description data from the ROM 54, and supplies the control data to the control register 52. The respective control data from the control register 52, are supplied to the gain amplifier 43, the filter 44, the MPX 46, the ADC 48 and the FIFO unit 50 in the input module 4.

In the input module 4, the gain of the gain amplifier 43, the cut-off frequency of the filter 44, a sampling frequency of the ADC 48, and others are determined based on the respective control data supplied by the control register 52. The ADC 48 converts the selected signal at the input of the ADC 48 into the instrumental data at the output of the ADC 48, and supplies the instrumental data to the FIFO unit 50. The instrumental data supplied by the ADC 48 is temporarily retained by the FIFO unit 50, and the FIFO unit 50 transmits the instrumental data to the DSP 26A of the data interface unit 26 of the recorder main part 11. The MPU 14 controls the DSP 26A of the data interface unit 26 so that the instrumental data (the digital data) is read from the FIFO unit 50, and the instrumental data is written to the data memory 24.

Figure 3:
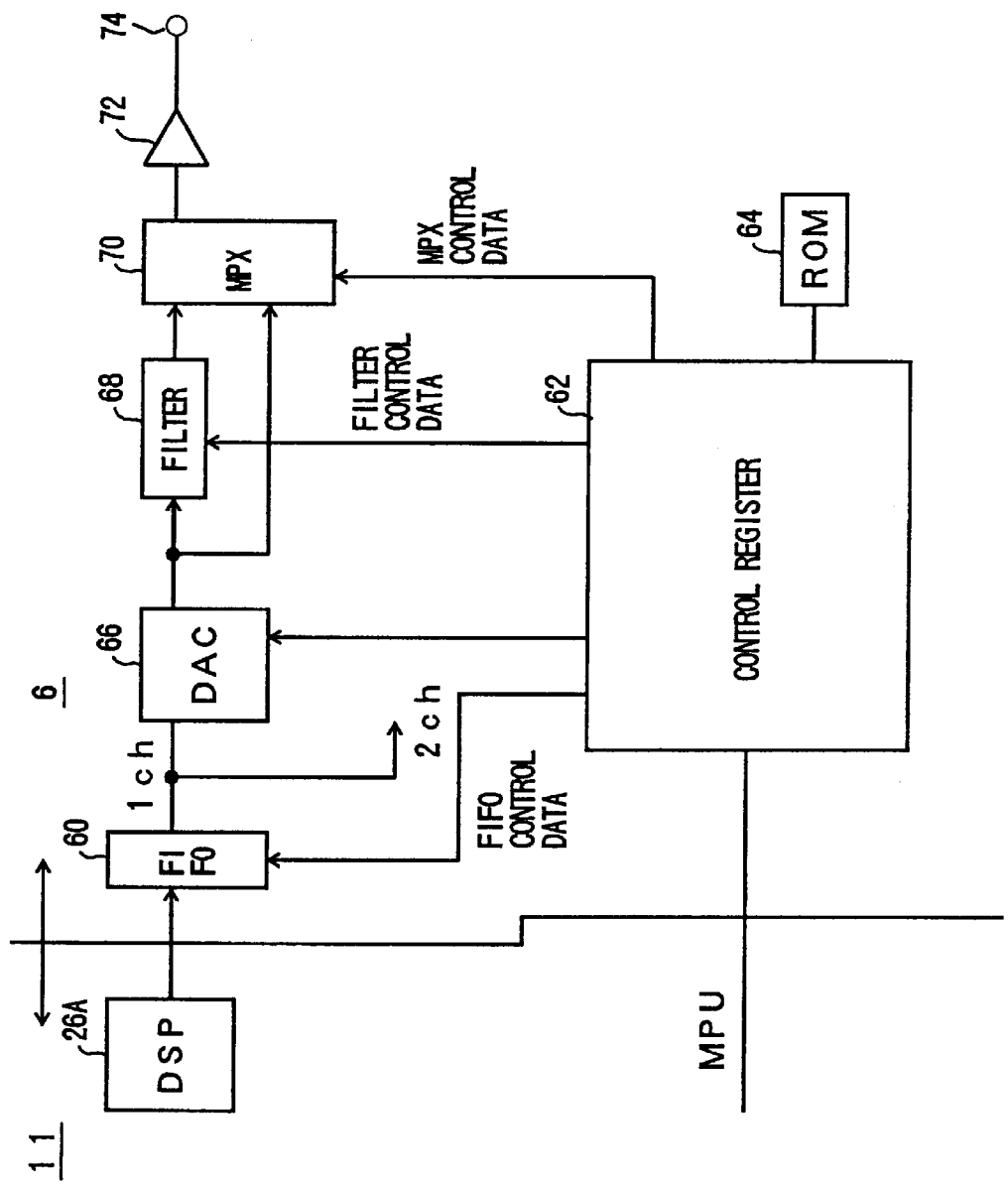
FIG. 3 is a block diagram showing a construction of an output module of the integrated recorder system of the present invention.

FIG. 3 shows a construction of an output module of the integrated recorder system of the present invention.

In the present embodiment, the output module 6 is inserted in one of the slots of the data interface unit 26 of the recorder main part 11, and the recorder main part 11 supplies an instrumental signal, stored in the data memory 24, to the output module 6 through the data interface unit 26. The data interface unit 26 is controlled to transmit the instrumental signal stored in the data memory 24, to the output module 6. The instrumental signal supplied to the output module 6 is, for example, a digital signal that is indicative of an instrumental value stored in the data memory 24.

As shown in FIG. 3, a first-in first-out (FIFO) unit 60 of the output module 6 of the present embodiment is connected to the DSP 26A of the data interface unit 26 in the recorder main part 11 by the bus connection slot. As described above, the data interface unit 26 and the data memory 24 are interconnected by the shared bus 28 in the recorder main part 11. Further, a control register 62 of the output module 6 is connected through the data interface unit 26 to the MPU 14 in the recorder main part 11. A read-only memory (ROM) 64 is connected to the control register 62. A module description data is stored in the ROM 64 in advance. The module description data stored in the ROM 64 is indicative of whether the module related to the control register 62 (or, in the present embodiment, the output module 6) is an input module or an output module, it is indicative of whether the instrumental signal supplied from or to the related module is a digital signal or an analog signal, and it is indicative of whether the instrumental signal supplied from or to the related module is a DC signal or an AC signal.

In the output module 6, as shown in FIG. 3, the instrumental signal from the recorder main part 11 is supplied to the FIFO unit 60 by the DSP 26A, and the instrumental signal is temporarily retained by the FIFO unit 60. The FIFO unit 60 supplies the retained instrumental signal to a digital-to-analog converter (DAC) 66. The DAC 66 converts the instrumental signal at the input of the DAC 66 into an analog signal, or an instrumental signal, at the output of the DAC 66. The DAC 66 supplies the instrumental signal at the output of the DAC 66 through a filter 68 to a first input of a multiplexer (MPX) 70, and supplies the instrumental signal directly to a second input of the MPX 70. The filter 68 passes through the instrumental signal only when the instrumental signal has a frequency that is in conformity with a cut-off frequency of the filter 68. The MPX 70 selects one of the signal at the first input of the MPX 70 and the signal at the second input of the MPX 70, and supplies the selected signal to an output buffer 72. The output buffer 72 serves as an output amplifier of the output module 6. The selected instrumental signal at the output of the MPX 70 is amplified by the output buffer 72, and the amplified signal at the output of the output buffer 72 is supplied to a connector terminal 74. For example, a signal display device (not shown) is connected to the connector terminal 74 of the output module 6 so that the signal supplied is indicated in a visual form by the signal display device.

In the output module 6, as shown in FIG. 3, the above-described elements 66 through 72 between the FIFO unit 60 and the connector terminal 74 are provided as a first-channel ("1 ch") signal line in the output module 6. Further, in the output module 6, additional elements which are essentially the same as the elements 66 through 72 of the first-channel signal line are also provided as a second-channel ("2 ch") signal line between the FIFO unit 60 and the connector terminal 74, but the additional elements are not illustrated in FIG. 3 for the sake of simplicity of description.

When the power switch of the recorder main part 11 is turned ON, the MPU 14 accesses the control register 62 and the ROM 64 in the output module 6 when the output module 6 is inserted in the slot of the data interface unit 26, and the MPU 14 reads the module description data from the ROM 64. The MPU 14 determines control data in response to the module description data from the ROM 64, and supplies the control data to the control register 62. The control data, supplied to the control register 62, include FIFO control data for the FIFO unit 60, DAC control data for the DAC 66, filter control data for the filter 68, and MPX control data for the MPX 70. The respective control data are supplied from the control register 62 to the MPX 70, the filter 68, the DAC 66 and the FIFO unit 60 in the output module 6.

In the output module 6, the cut-off frequency of the filter 68, the sampling frequency of the DAC 66, and others are determined based on the respective control data supplied by the control register 62. The MPU 14 in the recorder main part 11 controls the DSP 26A of the data interface unit 26 so that the instrumental data (the digital data) stored in the data memory 24 is transmitted to the FIFO unit 60. The instrumental data temporarily retained by the FIFO unit 60 is supplied to the DAC 66 at the sampling frequency which is determined based on the control data supplied by the control register 62.

Figure 4:
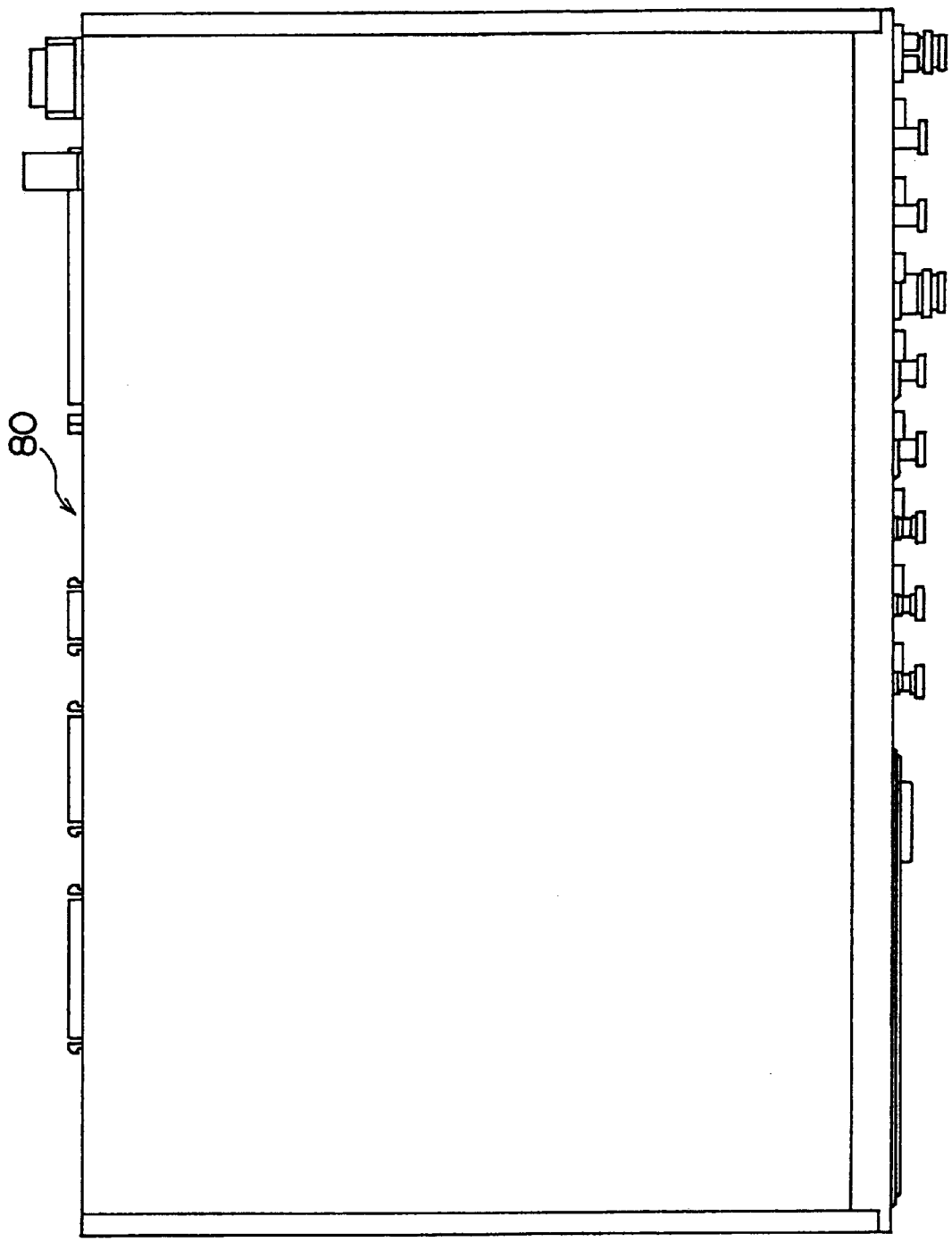
FIG. 4 is a top view of an embodiment of the integrated recorder system of the present invention.
Figure 5:
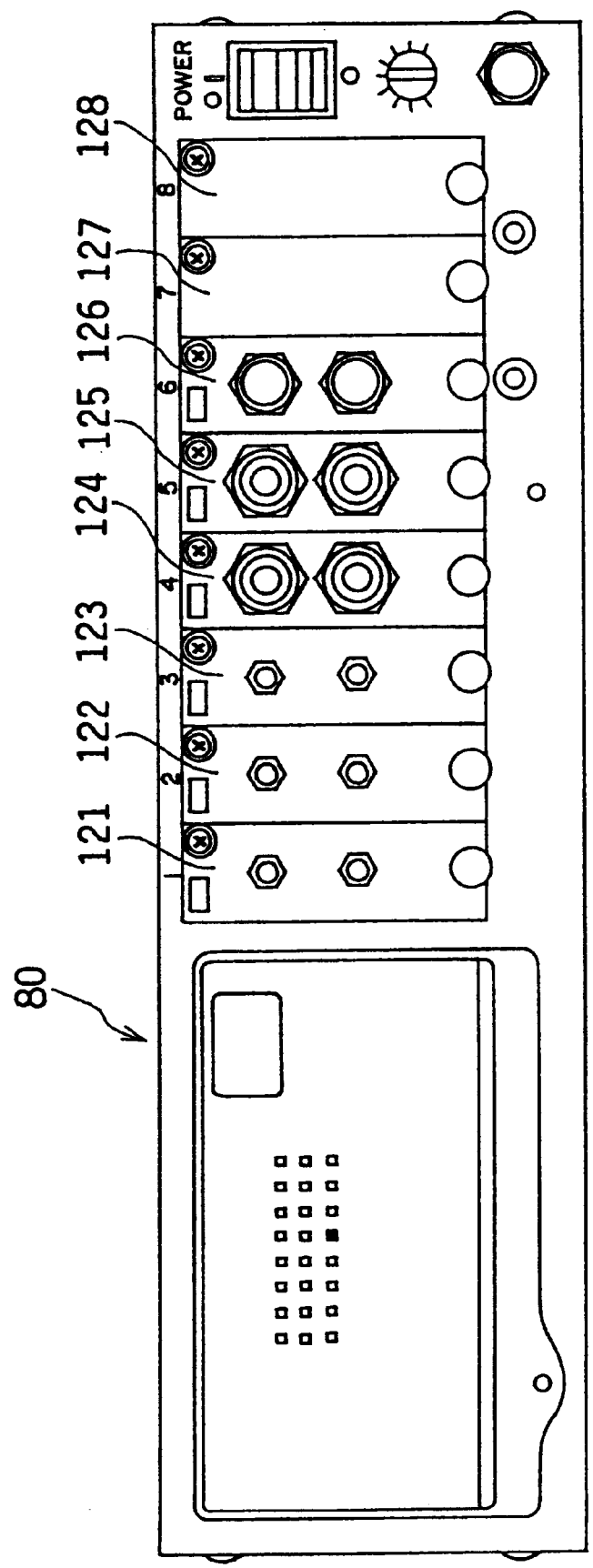
FIG. 5 is a front view of the embodiment of the integrated recorder system.

Next, FIG. 4 is a top view of an embodiment of the integrated recorder system of the present invention. FIG. 5 is a front view of the embodiment of the integrated recorder system.

As shown in FIG. 4 and FIG. 5, the integrated recorder system has a frame 80 which accommodates the recorder main part 11 and the plurality of modules 121 through 128. The modules 121–128 are inserted in the slots of the data interface unit 26 in the recorder main part 11. In the present embodiment, the modules 121, 122 and 123 are input modules which supply DC analog signals indicative of instrumental values, to the recorder main part 11, the modules 124 and 125 are input modules which supply digital signals indicative of instrumental values, to the recorder main part 11, the module 126 is an output module to which a digital signal indicative of an instrumental value, is supplied by the recorder main part 11, and the modules 127 and 128 are dummy modules which do not serve to supply signals to the recorder main part 11 or receive signals from the recorder main part 11. In FIG. 5, only front end surfaces of the modules 121–128 inserted in the recorder main part 11 are shown together with the frame 80.

In the above-described embodiment, the modules 121–128 can arbitrarily be inserted in or withdrawn from the slots of the data interface unit 26 of the recorder main part 11, regardless of whether the module being inserted is the input module 4 or the output module 6. It is not necessary to allocate a particular slot of the recorder main part 11 to the output module or to allocate a particular slot of the recorder main part 11 to the input module which supplies an analog signal or a digital signal. It is possible for the integrated recorder system of the above-described embodiment to allocate all the slots of the data interface unit 26 to the input modules which supply either analog signals or digital signals to the recorder main part 11. The integrated recorder system of the above-described embodiment is effective in providing flexibility of the number of the input modules or the output modules to be inserted in the slots of the data interface unit 26.

In the above-described embodiment, each of the modules 121–12N is provided with the ROM which stores the module description data therein, and the MPU 14 of the recorder main part 11 supplies the control data to the control register of the related module based on the module description data read from the ROM of the related module. Hence, the integrated recorder system of the above described embodiment is effective in automatically reading an instrumental signal supplied by the input module, so as to record instrumental data derived from the instrumental signal, and in automatically transmitting the instrumental data recorded therein to the output module, regardless of the type of the modules inserted in the slots of the recorder main part.

Unlike the above-described input unit 4 of FIG. 2, a digital input module which supplies a digital signal, indicative of an instrumental value, to the recorder main part 11 without performing the analog-to-digital conversion is provided only with the gain amplifier 43, the FIFO unit 50, the control register 52, and the ROM 54. The filter 44, the MPX 46 and the ADC 48 as in the input module 4 of FIG. 2 are not provided in the digital input module.

Further, the present invention is not limited to the above-described embodiments, and variations and modifications may be made without departing from the scope of the present invention.

The present invention is based on Japanese priority application No.9-288572, filed on Oct. 21, 1997, the entire contents of which are hereby incorporated by reference.

What is claimed is:

1. An integrated recorder system comprising:
   a recorder main part having a control unit for recording instrumental data in a data memory, the control unit and the data memory being interconnected by a shared bus;
   a plurality of modules each of which is arbitrarily inserted in or withdrawn from the recorder main part regardless of whether the module is an instrumental data input device or an instrumental data output device, the plurality of modules including input modules and an output module, each input module having a connector terminal from which an instrumental signal is supplied, wherein, when the instrumental signal is an analog signal, the input module converts the analog signal into a digital signal indicating instrumental data, and supplies the digital signal to the recorder main part; and
   a data interface unit, provided in the recorder main part, having a plurality of bus-connection slots for connecting the plurality of modules inserted therein to the data interface unit, so that the plurality of modules, the data interface unit and the data memory are connected together by the bus, the data interface unit being controlled by the control unit through the bus to read the instrumental signal from one of the input modules when inserted in the recorder main part, such that the instrumental data is recorded in the data memory, and controlled by the control unit through the bus to transmit the instrumental data, recorded in the data memory, to the output module when inserted in the recorder main part.

2. The integrated recorder system according to claim 1, wherein the plurality of modules include the output module, the output module being inserted in an arbitrary one of the slots of the data interface unit, the output module including a connector terminal to which an analog signal derived from the instrumental data transmitted by the data interface unit is output by the output module.

3. The integrated recorder system according to claim 1, wherein each of the plurality of modules includes:
   a memory for storing module description data, the module description data indicating an input/output type of the module and an analog/digital type of the instrumental signal related to the module; and a control register for supplying control data to elements of the module based on the module description data from the memory, wherein the control unit reads the module description data from the memory when a power switch of the recorder main part is turned on, and supplies the control data to the control register based on the module description data from the memory.

4. The integrated recorder system according to claim 1, wherein one of the plurality of modules is inserted in an arbitrary one of the slots of the data interface unit, regardless of whether the inserted module is the input module or the output module, and the control unit, the data interface unit and the inserted module are connected to one another by the bus so as to perform either the recording of the instrumental signal or the transmitting of the instrumental data.

5. The integrated recorder system according to claim 1, wherein the input module included in the plurality of modules is provided with an input amplifier for amplifying the instrumental signal supplied from the connector terminal of the input module.

6. The integrated recorder system according to claim 1, wherein the data interface unit includes a digital signal processor for filtering the instrumental data so as to eliminate high-frequency components produced therein by an analog-to-digital converter of one of the plurality of modules.

7. The integrated recorder system according to claim 1, wherein the data interface unit includes a direct memory access controller for writing the instrumental data, read from one of the plurality of modules, to the data memory.

8. The integrated recorder system according to claim 1, wherein the data interface unit includes a data buffer for temporarily retaining the instrumental data read from one of the plurality of modules before writing the instrumental data to the data memory.

* * * * *